United States Patent [19]
Nihira et al.

[11] Patent Number: 5,608,033
[45] Date of Patent: Mar. 4, 1997

[54] LIQUID CRYSTAL ALIGNMENT FILM

[75] Inventors: Takayasu Nihira; Yoshio Miyamoto; Hideyuki Endo; Toyohiko Abe, all of Funabashi, Japan

[73] Assignee: Nissan Chemical Industries, Ltd., Tokyo, Japan

[21] Appl. No.: 435,663

[22] Filed: May 5, 1995

[30] Foreign Application Priority Data

May 9, 1994 [JP] Japan .................................. 6-094887
May 9, 1994 [JP] Japan .................................. 6-094888

[51] Int. Cl.$^6$ ..................................... C08G 73/10
[52] U.S. Cl. .......................... 528/353; 528/125; 528/128; 528/172; 528/173; 528/176; 528/183; 528/188; 528/220; 528/229; 528/350; 428/1; 428/473.5
[58] Field of Search ................. 428/1, 473.5; 528/353, 528/125, 350, 128, 172, 173, 176, 183, 188, 220, 229

[56] References Cited

FOREIGN PATENT DOCUMENTS

| | | |
|---|---|---|
| 0282254 | 9/1988 | European Pat. Off. . |
| 0365855 | 5/1990 | European Pat. Off. . |
| 0415447 | 3/1991 | European Pat. Off. . |
| 0540829 | 5/1993 | European Pat. Off. . |

*Primary Examiner*—James J. Seidleck
*Assistant Examiner*—P. Hampton-Hightower
*Attorney, Agent, or Firm*—Oblon, Spivak, McClelland, Maier & Neustadt, P.C.

[57] ABSTRACT

A liquid crystal alignment film made of a polyimide which has, on its side chain, a benzene or biphenyl ring substituted by a monovalent substituent having a positive value as the σp value under Hammett's rule.

5 Claims, No Drawings

LIQUID CRYSTAL ALIGNMENT FILM

BACKGROUND OF THE INVENTION

1. Field of the Invention

The present invention relates to a liquid crystal alignment film. More particularly, it relates to a novel liquid crystal alignment film which can readily be prepared on an industrial scale and whereby a large tilt angle of liquid crystal molecules and stabilized alignment characteristics can be obtained.

2. Description of the Prior Art.

Liquid display devices are display devices which utilize electrooptical changes of liquid crystals, and they are small in size and light in weight and have a feature that their power consumption is small. Accordingly, they have found remarkable developments in recent years as display devices for various displays. Among them, a twisted nematic type (TN type) electric field effect liquid crystal display device is a typical example wherein a nematic liquid crystal having a positive dielectric anisotropy is used, so that liquid crystal molecules are aligned in parallel with a pair of mutually opposing electrode substrates at the respective interfaces, and the two substrates are arranged so that the alignment directions of the respective liquid crystal molecules will cross each other.

In such a TN type liquid crystal display device, it is important to align liquid crystal molecules so that their axial directions will be uniformly in parallel with the surface of a substrate and so that the liquid crystal molecules will have a certain inclination angle (hereinafter referred to as a tilt angle) to the substrate. The following two methods are known as typical methods for aligning liquid crystal molecules in such a manner.

The first method is a method in which an inorganic substance such as silicon oxide is vapor-deposited obliquely to the substrate to form an inorganic film on the substrate, so that liquid crystal molecules are aligned in the direction of vapor deposition. This method is not efficient from the industrial point of view although it is thereby possible to attain stabilized alignment with a certain specific tilt angle.

The second method is a method wherein an organic coating film is formed on the surface of a substrate, and its surface is rubbed in a certain predetermined direction with a cloth of e.g. nylon or polyester, so that liquid crystal molecules are aligned in the direction of rubbing. By this method, it is possible to attain stabilized alignment relatively easily. Accordingly, this method is principally employed for industrial purpose. As the organic film, polyvinyl alcohol, polyoxyethylene, polyamide or polyimide may, for example, be used. However, the polyimide is most commonly used in view of the chemical stability, thermal stability, etc. However, the tilt angle obtainable by rubbing the polyimide is usually at a level of from 1° to 3°, and it has been difficult to attain a larger tilt angle.

In the field of liquid crystal alignment films, it has been difficult to obtain a large tilt angle constantly by a method of rubbing an organic film of polyimide or the like. As a means to solve such a difficulty, Japanese Unexamined Patent Publication No. 297819/1987 proposes a treating agent for liquid crystal alignment which is composed of a reaction product of a long chain alkylamine with a polyimide precursor. Further, Japanese Unexamined Patent Publications No. 262527/1989 and No. 262528/1989 propose an agent for liquid crystal alignment which is composed of a mixture comprising a long chain alkyl compound and a polyimide precursor. Still further, Japanese Unexamined Patent Publication No. 25126/1989 proposes a treating agent for liquid crystal alignment which is composed of a polyimide prepared from a diamine having an alkyl group. Thus, many attempts have been made to increase the tilt angle of liquid crystal by introducing an alkyl group into a polyimide, and it has been possible to increase the tilt angle to some extent. On the other hand, however, there has been a new problem such that when an alkyl group is introduced into a polyimide, the polyimide surface tends to be water-repellent, whereby wettability of liquid crystal to the polyimide surface tends to be low. If the alkyl group is excessively introduced into a polyimide to increase the tilt angle, the wettability of liquid crystal tends to be low, and in an extreme case, failure in the liquid crystal alignment is likely to result. Consequently, the display performance of the liquid crystal display device tends to be poor.

Accordingly, it has been desired to develop a polyimide for alignment films whereby a large tilt angle can be obtained by rubbing and which provides adequate wettability with liquid crystal and excellent properties for alignment.

Depending upon the aligned states of their molecules, liquid crystals are classified into nematic, smectic and cholesteric. However, a common feature is that long axes of constituting molecules are aligned in parallel with one another. As prerequisites for a certain compound to exhibit a liquid crystal property from such a regular molecular alignment, there may be mentioned (1) that the molecular structure has a geometric shape suitable for the parallel alignment, and (2) that an intermolecular attraction sufficient to maintain the parallel alignment, is maintained. Because of these two prerequisites, a compound to exhibit a liquid crystal property is required to have a rod-like or a plate-like molecular shape, and further have a permanent dipole or a readily polarizable chemical bond group (functional group). Further, the type of a liquid crystal phase is said to be determined by a proper balance of the intermolecular attraction as between the terminals and between the side surfaces of such a rod-shaped molecule ("Most Recent Technology for Liquid Crystal" edited by Shoichi Matsumoto and Ichiyoshi Kakuta, p. 62, 1983, published by Kogyo Chosakai).

SUMMARY OF THE INVENTION

The present inventors have conducted extensive studies to improve the alignment property of liquid crystal by an alignment film for liquid crystal and as a result, have found that the alignment property of liquid crystal can be remarkably improved by introducing into the molecular structure of a polyimide a structure whereby an action corresponding to the intermolecular attraction effective among such liquid crystal molecules, can be maintained also between the polyimide of the alignment film and the liquid crystal molecules. The present invention has been accomplished on the basis of this discovery.

Thus, the present invention provides:

1. A liquid crystal alignment film made of a polyimide which has, on its side chain, a benzene or biphenyl ring substituted by a monovalent substituent having a positive value as the σp value under Hammett's rule.
2. The liquid crystal alignment film according to the above item 1, wherein the polyimide is a polyimide obtained by reacting an aromatic diamine having bonded thereto a benzene or biphenyl ring substituted by a monovalent substituent having a positive value as the σp value under Hammett's rule, with a tetracarboxylic acid or its derivative to obtain a polyimide precursor having a reduced viscosity of from 0.05 to 5.0 dl/g (in N-methylpyrrolidone at 30° C., concentration: 0.5 g/dl) and subjecting the polyimide precursor to ring closure.

3. The liquid crystal alignment film according to the above item 1, wherein the polyimide is a polyimide obtained by reacting a diamine component containing at least 5 mol % of an aromatic diamine having bonded thereto a benzene or biphenyl ring substituted by a monovalent substituent having a positive value as the σp value under Hammett's rule, with a tetracarboxylic acid or its derivative to obtain a polyimide precursor having a reduced viscosity of from 0.05 to 5.0 dl/g (in N-methylpyrrolidone at 30° C., concentration: 0.5 g/dl) and subjecting the polyimide precursor to ring closure.

4. The liquid crystal alignment film according to the above item 2 or 3, wherein the aromatic diamine having bonded thereto a benzene or biphenyl ring substituted by a monovalent substituent having a positive value as the σp value under Hammett's rule, is a diamine of the formula (I):

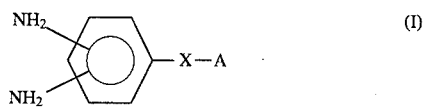

wherein A is

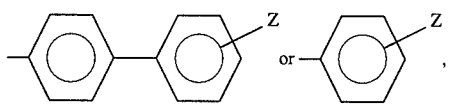

X is a bivalent connecting group selected from the group consisting of a single bond, —O—, —COO— and —CONH—, and Z is a monovalent substituent having a positive value as the σp value under Hammett's rule.

DESCRIPTION OF THE PREFERRED EMBODIMENTS

Now, the present invention will be described in detail with reference to the preferred embodiments.

The liquid crystal alignment film of the present invention is the one having a benzene or biphenyl ring substituted by an electron attractive substituent, introduced to a side chain of a polyimide which has been used for an alignment film, whereby alignment of liquid crystal molecules can be stabilized, and a very large tilt angle can be obtained.

Except for discotic liquid crystal molecules, almost all of liquid crystal molecules have rod-shaped chemical structures, and they are composed of cyclic groups substituted by polar groups, which have a substantial degree of rigidity and which are called "cores", and linear alkyl groups. Particularly, in a case where the cyclic groups are benzene rings, the degree of the liquid crystal nature depends on substituents bonded to the benzene rings, and the ranking of such substituents depends on the degree of establishing a conjugate electron system with the benzene or biphenyl rings ("Liquid Crystals-Fundamentals" coauthored by Mitsuharu Okano and Shinsuke Kobayashi, p. 185, 1985, published by Baiyukan).

The polyimide used for the alignment film of the present invention is a polyimide having, on its side chain, a benzene or biphenyl ring substituted by a certain specific substituent. In this case, the substituent on the benzene or biphenyl ring is selected from those corresponding to substituents which are capable of increasing the liquid crystal nature of the liquid crystal molecules, and in particular, they are substituents having a high electron attracting nature. As an index for the electron attracting nature of a substituent, the σp value under Hammett's rule is widely known ("Hammett Rule -Structure and Reactivity-" edited by Naoki Inamoto, p. 20, 1983, published by Maruzen).

When represented by the σp value under Hammett's rule, the specific substituent substituted on the side chain benzene or biphenyl ring of the polyimide of the present invention must be a substituent having a positive value as the σp value. So long as this condition is satisfied, the type of the substituent is not particularly limited. However, substituents in Table 1 may be mentioned as typical examples.

TABLE 1

| Substituent | CF$_3$ | CN | COCH$_3$ | COOH | COOR | NO$_2$ |
|---|---|---|---|---|---|---|
| σp value | 0.54 | 0.66 | 0.50 | 0.45 | 0.45 | 0.78 |
| Substituent | SOCH$_3$ | SO$_2$CH$_3$ | F | Cl | OCF$_3$ | |
| σp value | 0.49 | 0.72 | 0.06 | 0.23 | 0.35 | |

("Hammett Rule -Structure and Reactivity-" edited by Naoki Inamoto, attached Table 1, 1983, published by Maruzen)

Further, from the availability of the starting material and easiness in the synthesis, it is preferred to select a halogen atom, a cyano group, a trifluoromethyl group or a trifluoromethoxy group as the substituent.

The method for producing the polyimide to be used in the present invention is not particularly limited. Usually, it can be prepared by poly-condensing an aromatic diamine (hereinafter referred to as diamine-1) having bonded thereto a benzene or biphenyl ring substituted by a monovalent substituent having a positive value as the σp value under Hammett's rule, with a tetracarboxylic acid or its derivative such as a tetracarboxylic acid, a tetracarboxylic acid dihalide or a tetracarboxylic acid dianhydride.

Diamine-1 is not particularly limited so long as it satisfies the above condition. However, its specific examples include the following compounds:

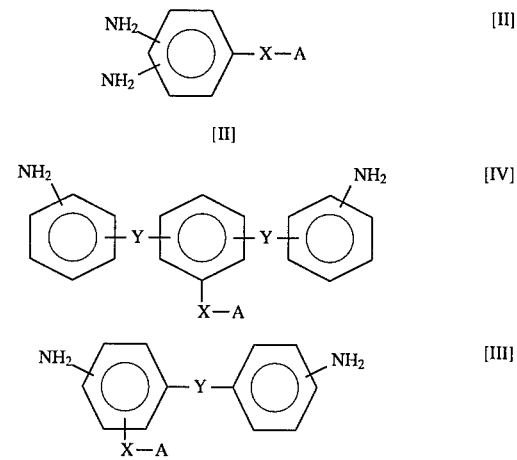

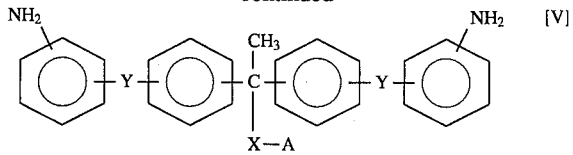

In the above formulas, A is

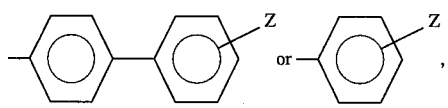

X is a bivalent connecting group selected from the group consisting of a single bond, —O—, —COO— and —CONH—, Y is a bivalent connecting group selected from the group consisting of a single bond, —O—, —CO— and —CH₂—, and Z is a monovalent substituent having a positive value as the σp value under Hammett's rule.

It is common that the substituent Z is located at the p-position to the connecting group X. From the availability of the starting material and easiness in the synthesis, the following compounds may be mentioned as typical examples:

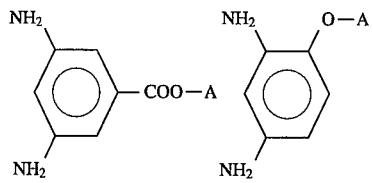

in these formulas, A is a benzene or biphenyl ring substituted by a monovalent substituent Z having a positive value as the σp value under Hammett's rule. The benzene ring has a merit that it is easy to prepare, and it is easy and inexpensive to obtain starting materials for the preparation of the diamine. The biphenyl ring has a merit that a larger tilt angle can be obtained as compared with a case where a benzene ring is employed. Such a ring structure can be suitably selected depending upon the necessary conditions under which a polyimide is actually used as a liquid crystal alignment film.

A method for obtaining a polyimide of the present invention is not particularly limited. Specifically, a tetracarboxylic acid or its derivative may be reacted and polymerized with a diamine to form a polyimide precursor, which is then subjected to ring closure imide-conversion to obtain a polyimide.

The tetracarboxylic acid or its derivative to be used for the preparation of a polyimide of the present invention, is not particularly limited.

Specific examples include aromatic tetracarboxylic acids such as pyromellitic acid, 2,3,6,7-naphthalene tetracarboxylic acid, 1,2,5,6-naphthalene tetracarboxylic acid, 1,4,5,8-naphthalene tetracarboxylic acid, 2,3,6,7-anthracene tetracarboxylic acid, 1,2,5,6-anthracene tetracarboxylic acid, 3,3',4,4'-biphenyl tetracarboxylic acid, 2,3,3',4'-biphenyl tetracarboxylic acid, bis(3,4-dicarboxyphenyl)ether, 3,3',4,4'-benzophenone tetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4dicarboxyphenyl)dimethylsilane, bis(3,4-dicarboxyphenyl)diphenylsilane, 2,3,4,5-pyridine tetracarboxylic acid and 2,6-bis(3,4-dicarboxyphenyl)pyridine, and their dianhydrides as well as their dicarboxylic acid diacid halides; alicyclic tetracarboxylic acids such as 1,2,3,4-cyclobutane tetracarboxylic acid, 1,2,3,4-cyclopentane tetracarboxylic acid, 1,2,4,5-cyclohexane tetracarboxylic acid, 2,3,5-tricarboxycyclopentylacetic acid and 3,4-dicarboxy-1,2,3,4-tetrahydro-1-naphthalenesuccinic acid, and their dianhydrides as well as their dicarboxylic acid diacid halides; and aliphatic tetracarboxylic acids such as 1,2,3,4-butane tetracarboxylic acid, and their dianhydrides as well as their dicarboxylic acid diacid halides.

For the application as alignment films, alicyclic tetracarboxylic acids and their dianhydrides as well as their dicarboxylic acid diacid halides are preferred from the viewpoint of the transparency of the coating films. Particularly preferred is 1,2,3,4-cyclobutanetetracarboxylic acid dianhydride.

Such tetracarboxylic acids and their derivatives may be used alone or in combination as a mixture of two or more of them.

In the present invention, a tetracarboxylic acid or its derivative, diamine-1 and other common diamine (hereinafter referred to simply as a common diamine) may be copolymerized. However, the diamine to be used to obtain the polyimide of the present invention necessarily contains diamine-1 as an essential component.

The common diamine is a primary diamine which is commonly used for the synthesis of a polyimide, and it is not particularly limited.

Specific examples of such a common diamine include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy) diphenylsulfone, 2,2'-bis[4-(4-aminophenoxy)phenyl]propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane and bis(4-amino-3-methylcyclohexyl)methane; and aliphatic diamines such as tetramethylene diamine and hexamethylene diamine, as well as diaminosiloxanes of the formula:

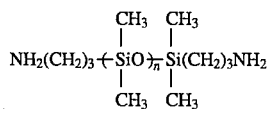

wherein n is an integer of from 1 to 10.

These diamines may be used alone or in combination as a mixture of two or more of them.

By adjusting the molar ratio of diamine-1 to the total molar amount of the diamine used at the time of polymerization to obtain a polyimide of the present invention, it is possible to modify the surface properties, such as water repellency, of the polyimide, and further, when such a polyimide is used as a liquid crystal alignment film, it is possible to improve the wettability with the liquid crystal and to increase the tilt angle of the liquid crystal. In such a case, the molar ratio of diamine-1 to the total molar amount of the diamine used, is preferably at least 5 mol %.

A tetracarboxylic acid or its derivative is reacted and polymerized with the diamine to form a polyimide precursor, which is then subjected to ring closure imide-conversion. Here, it is common to employ a tetracarboxylic acid dianhydride as the tetracarboxylic acid or its derivative. The ratio of the molar amount of the tetracarboxylic acid dianhydride and the total molar amount of the diamine is preferably from 0.8 to 1.2. Like in a usual polycondensation reaction, the closer the molar ratio to 1, the larger the polymerization degree of the resulting polymer.

If the polymerization degree is too small, the strength of the polyimide film tends to be inadequate when it is used as an alignment film, whereby alignment of liquid crystal tends to be unstable. On the other hand, if the polymerization degree is too large, the operation efficiency for forming a polyimide film is likely to be poor.

Accordingly, the polymerization degree of the product in this reaction is preferably from 0.05 to 5.0 dl/g (in N-methylpyrrolidone at a temperature of 30° C., concentration: 0.5 g/dl) as calculated as the reduced viscosity of the polyimide precursor solution.

The method for reacting and polymerizing the tetracarboxylic acid dianhydride with the diamine is not particularly limited. It is common to employ a method wherein the diamine is dissolved in an organic polar solvent such as N-methylpyrrolidone, N,N-dimethylacetamide or N,N-dimethylformamide, and the tetracarboxylic acid dianhydride is added and reacted to the solution to obtain a polyimide precursor, followed by dehydration for ring closure imide-conversion.

The reaction temperature at the time of reacting the tetracarboxylic acid dianhydride with the diamine to form a polyimide precursor, may be selected to be an optional temperature within a range of from −20° to 150° C., preferably from −5° to 100° C.

Further, this polyimide precursor is heated and dehydrated at a temperature of from 100° to 400° C., or subjected to chemical imide-conversion by means of a commonly employed imide-conversion catalyst such as triethylamine/ acetic anhydride, to obtain a polyimide.

To use the polyimide of the present invention as an insulating film or a protective film for an electrical or electronic element, or as an alignment film for a liquid crystal display device, it is necessary to form a polyimide coating film in a uniform thickness on a substrate.

To form such a polyimide coating film, the polyimide precursor solution may usually be coated on a substrate as it is and heated for imide-conversion to form a polyimide coating film on the substrate. As the polyimide precursor solution to be used, the above-mentioned polymerization solution may be used as it is, or the formed polyimide precursor may be put into a large excess amount of water or a poor solvent such as methanol, for precipitation and recovery, and then it is re-dissolved in a solvent for use. The solvent for diluting the above polyimide precursor solution and/or the solvent for re-dissolving the polyimide precursor recovered by precipitation, is not particularly limited, so long as it is capable of dissolving the polyimide precursor. Specific examples of such solvents include N-methylpyrrolidone, N,N-dimethylacetamide and N,N-dimethylformamide. These solvents may be used alone or in combination as a mixture.

Further, even a solvent which is in capable of providing a uniform solution by itself, may be incorporated within a range in which a uniform solution can be obtained.

The temperature for heating for imide-conversion on the substrate may be optionally selected within a range of from 100° to 400° C. However, particularly preferred is a temperature within a range of from 150° to 350° C.

On the other hand, in a case where the polyimide of the present invention is soluble in a solvent, the polyimide precursor obtained by reacting a tetracarboxylic acid dianhydride with a diamine, may be subjected to imide-conversion in a solution to obtain a polyimide solution. To convert the polyimide precursor to a polyimide in a solution, it is usual to employ a method whereby dehydration ring-closure is carried out by heating. The temperature for heating for dehydration ring-closure can be optionally selected within a range of from 100° to 350° C., preferably from 120° to 250° C.

As another method for converting the polyimide precursor to a polyimide, it is possible to carry out the ring closure chemically by means of a conventional catalyst for dehydration ring closure.

The polyimide solution thus obtained may used as it is, or it may be precipitated in a poor solvent such as methanol or ethanol, isolated and then re-dissolved in a proper solvent for use. The solvent for re-dissolving it, is not particularly limited so long as it is capable of dissolving the obtained polyimide. It may, for example, be 2-pyrrolidone, N-methylpyrrolidone, N-ethylpyrrolidone, N-vinylpyrrolidone, N,N-dimethylacetamide, N,N-dimethylformamide or γ-butyrolactone.

In addition, even a solvent which is in capable of dissolving the polyimide by itself, may be added to the above solvent within a range not to impair the solubility. Such a solvent may, for example, be ethyl cellosolve, butyl cellosolve, ethyl carbitol, butyl carbitol, ethyl carbitol acetate or ethylene glycol.

Further, for the purpose of improving the adhesion of the polyimide film to the substrate, it is preferred to add an additive such as a coupling agent to the obtained polyimide solution.

A polyimide coating film can be formed on the substrate by coating such a solution on the substrate and evaporating the solvent. The temperature in such a case may be at such a level that the solvent evaporates, and it is usually from 80° to 150° C.

In such a manner, a polyimide film having a thickness of from 200 to 3000 Å may be formed on a transparent substrate such as a glass sheet or a plastic film having a transparent electrode, and then the polyimide layer is subjected rubbing treatment to obtain a liquid crystal alignment film.

Now, the present invention will be described in further detail with reference to Examples. However, it should be understood that the present invention is by no means restricted to such specific Examples.

In each Example, a liquid crystal cell was prepared and the alignment properties of liquid crystal were examined by the following methods.

Evaluation of the Water Repellency

A polyimide precursor solution was diluted with N-methylpyrrolidone to obtain a solution having a resin concentration of 6%. The solution was spin-coated at 3500 rpm on a glass substrate and heat-treated at 80° C. for 10 minutes and 250° C. for one hour to form a uniform polyimide coating film, whereupon the contact angles of water and methylene iodide on the coating film were measured, and the surface energy of the polyimide was calculated by the Fowkes formula.

Evaluation of the Tilt Angle

A polyimide precursor solution was diluted with N-methylpyrrolidone to obtain a solution having a resin concentration of 6%. The solution was spin-coated at 3500 rpm on a glass substrate provided with a transparent electrode and heat-treated at 80° C. for 10 minutes and 250° C. for one hour to form a uniform polyimide coating film. This coating film was rubbed with a cloth. Then, a pair of substrates subjected to such rubbing treatment, were assembled with a spacer of 23 μm interposed therebetween, so that the respective rubbing directions were in parallel with each other, and a liquid crystal (ZLI-2293, manufactured by Merck Co.) was injected into the space to obtain a cell having a homogeneous alignment.

With respect to this cell, the uniformity of the liquid crystal alignment was confirmed under a polarized microscope, and then the tilt angle was measured by a magnetic field capacity method.

EXAMPLE 1

1.0 g (4.44 mmol) of 4-(4-cyanophenoxy)-1,3-diaminobenzene as an aromatic diamine having bonded thereto a phenyl ring substituted by a cyano group having a positive value as the σp value under Hammett's rule (σp=0.66), and 871 mg (4.44 mmol) of 1,2,3,4-cyclobutane tetracarboxylic dianhydride as a tetracarboxylic acid, were dissolved in 16.8 g of N-methylpyrrolidone in a nitrogen stream in a 20 ml flask and stirred at 20° C. for 4 hours for a polycondensation reaction to obtain a polyimide precursor solution.

The reduced viscosity of the obtained polyimide precursor was 0.49 dl/g (concentration: 0.5 g/dl, in NMP, 30° C.).

Further, this solution was coated on a glass substrate and heat-treated at 250° C. for one hour to form a uniform polyimide coating film. The obtained coating film was subjected to IR measurement and found to be a polyimide containing a cyanophenyl group.

Using the obtained polyimide precursor solution, water repellency of the polyimide coating film was examined, whereby its surface energy was found to be 52 dyn/cm. Further, a liquid crystal cell was prepared, and the alignment properties and the tilt angle were measured, whereby flawless uniform orientation was observed, and the tilt angle was as high as 27 degree.

EXAMPLE 2

A polyimide precursor solution was prepared in the same manner as in Example 1 except that 445 mg (1.66 mmol) of 4-(4-trifluoromethylphenoxy)-1,3-diaminobenzene was used as an aromatic diamine having a phenyl ring substituted by a trifluoromethyl group having a positive value as the σp value under Hammett's rule (σp=0.54). The reduced viscosity of the polyimide precursor solution was 0.42 dl/g (concentration: 0.5 g/dl, in NMP, 30° C.), and from the IR measurement of the polyimide coating film, it was found to be a polyimide containing a trifluoromethylphenyl group.

Using the obtained polyimide precursor solution, a liquid crystal cell was prepared, whereby flawless uniform orientation was obtained. Further, the water repellency and the tilt angle of the polyimide coating film were as shown in Table 2.

EXAMPLE 3

A polyimide precursor solution was prepared in the same manner as in Example 1 except that 362 mg (1.66 mmol) of 4-(4-fluorophenoxy)-1,3-diaminobenzene was used as an aromatic diamine having bonded thereto a phenyl ring substituted by fluorine having a positive value as the σp value under Hammett's rule (σp=0.06). The reduced viscosity of the polyimide precursor solution was 1.06 dl/g (concentration: 0.5 g/dl, in NMP, 30° C.), and from the IR measurement of the polyimide coating film, it was found to be a polyimide containing a fluorophenyl group.

Using the obtained polyimide precursor solution, a liquid crystal cell was prepared, whereby flawless uniform orientation was obtained. Further, the water repellency and the tilt angle of the polyimide coating film were as shown in Table 2.

EXAMPLE 4

A polyimide precursor solution was prepared in the same manner as in Example 1 except that 491 mg (1.66 mmol) of 5-(4-trifluoromethylphenyloxycarbonyl)-1,3-diaminobenzene was used as an aromatic diamine having bonded thereto a phenyl ring substituted by a trifluoromethyl group having a positive value as the σp value under Hammett's rule (σp=0.54). The reduced viscosity of the polyimide precursor solution was 0.98 dl/g (concentration: 0.5 g/dl, in NMP, 30° C.), and from the IR measurement of the polyimide coating film, it was found to be a polyimide containing a trifluoromethylphenyl group.

Using the obtained polyimide precursor solution, a liquid crystal cell was prepared, whereby flawless uniform alignment was obtained. Further, the water repellency and the tilt angle of the polyimide coating film were as shown in Table 2.

COMPARATIVE EXAMPLE 1

A polyimide precursor solution was prepared in the same manner as in Example 1 except that 320 mg (1.66 mmol) of 4-phenoxy-1,3-diaminobenzene was used as an aromatic diamine component having bonded thereto a non-substituted phenyl ring having a 0 value as the σp value under Hammett's rule. The reduced viscosity of the polyimide precursor solution was 0.51 dl/g (concentration: 0.5 g/dl, in NMP, 30° C.), and the water repellency and the tilt angle of the polyimide coating film were as shown in Table 2.

COMPARATIVE EXAMPLE 2

A polyimide precursor solution was prepared in the same manner as in Example 1 except that 368 mg (1.66 mmol) of 4-(4-methoxyphenoxy)-1,3-diaminobenzene was used as an aromatic diamine having bonded thereto a phenyl group substituted by a methoxy group having a negative value as the σp value under Hammett's rule (σp=−0.27). The reduced viscosity of the polyimide precursor solution was 0.61 dl/g (concentration: 0.5 g/dl, in NMP, 30° C.), and the water repellency and the tilt angle of the polyimide coating film were as shown in Table 2.

COMPARATIVE EXAMPLE 3

A polyimide precursor solution was prepared in the same manner as in Example 1 except that 346 mg (1.66 mmol) of 4-(4-hydroxyphenoxy)-1,3-diaminobenzene was used as an aromatic diamine having bonded thereto a phenyl group substituted by a hydroxyl group having a negative value as the σp value under Hammett's rule (σp=−0.36). The reduced viscosity of the polyimide precursor solution was 0.64 dl/g (concentration: 0.5 g/dl, in NMP, 30° C.), and the water repellency and the tilt angle of the polyimide coating film were as shown in Table 2.

TABLE 2

|  | Substituent | σp value | Surface energy | Tilt angle |
|---|---|---|---|---|
| Example 1 | CN | 0.66 | 52 dyn/cm | 27° |
| Example 2 | CF$_3$ | 0.54 | 37 dyn/cm | 39° |
| Example 3 | F | 0.06 | 46 dyn/cm | 7° |
| Example 4 | CF$_3$ | 0.35 | 37 dyn/cm | 23° |
| Comparative Example 1 | H | 0 | 49 dyn/cm | 3° |
| Comparative Example 2 | OCH$_3$ | −0.27 | 49 dyn/cm | 3° |
| Comparative Example 3 | OH | −0.36 | 49 dyn/cm | 3° |

EXAMPLE 5

500 mg (1.66 mmol) of 4-(4-cyanobiphenyl-4'-oxy)-1,3-diaminobenzene as an aromatic diamine having bonded thereto a biphenyl ring substituted by a cyano group having a positive value as the σp value under Hammett's rule (σp=0.66), and 323 mg (1.66 mmol) of 1,2,3,4-cyclobutane tetracarboxylic dianhydride as a tetracarboxylic acid, were dissolved in 7.41 g of N-methylpyrrolidone in a nitrogen stream in a 20 ml flask and stirred at 20° C. for 4 hours for a polycondensation reaction to obtain a polyimide precursor solution.

The reduced viscosity of the obtained polyimide precursor was 0.38 dl/g (concentration: 0.5 g/dl, in NMP, 30° C.).

Further, this solution was coated on a glass substrate and heat-treated at 250° C. for one hour to form a uniform polyimide coating film. The obtained coating film was subjected to IR measurement and found to be a polyimide containing a cyanobiphenyl group.

Using the obtained polyimide precursor solution, the water repellency of the polyimide coating film was examined, whereby its surface energy was found to be 56 dyn/cm. Further, a liquid crystal cell was prepared, and the alignment properties and the tilt angle were measured, whereby flawless uniform alignment was obtained, and the tilt angle was as high as 55 degree.

EXAMPLE 6

A polyimide precursor solution was prepared in the same manner as in Example 5 except that 598 mg (1.66 mmol) of 4-(4-trifluoromethoxybiphenyl-4'-oxy)-1,3-diaminobenzene was used as an aromatic diamine having bonded thereto a biphenyl ring substituted by a trifluoromethoxy group having a positive value as the σp value under Hammett's rule (σp=0.35). The reduced viscosity of the polyimide precursor solution was 0.62 dl/g (concentration: 0.5 g/dl, in NMP, 30° C.), and from the IR measurement of the polyimide coating film, it was found to be a polyimide containing a trifluoromethoxybiphenyl group.

Using the obtained polyimide precursor solution, a liquid crystal cell was prepared, whereby flawless uniform alignment was obtained. Further, the water repellency and the tilt angle of the polyimide coating film were as shown in Table 3.

EXAMPLE 7

A polyimide precursor solution was prepared in the same manner as in Example 5 except that 489 mg (1.66 mmol) of 4-(4-fluorobiphenyl-4'-oxy)1,3-diaminobenzene was used as an aromatic diamine having bonded thereto a biphenyl ring substituted by fluorine group having a positive value as the σp value under Hammett's rule (σp=0.06). The reduced viscosity of the polyimide precursor solution was 0.51 dl/g (concentration: 0.5 g/dl, in NMP, 30° C.), and from the IR measurement of the polyimide coating film, it was found to be a polyimide containing a fluorobiphenyl group.

Using the obtained polyimide precursor solution, a liquid crystal cell was prepared, whereby flawless uniform alignment was obtained. Further, the water repellency and the tilt angle of the polyimide coating film were as shown in Table 3.

EXAMPLE 8

A polyimide precursor solution was prepared in the same manner as in Example 5 except that 645 mg (1.66 mmol) of 5-(4-trifluoromethoxybiphenyl-4'-oxycarbonyl)-1,3-diaminobenzene was used as an aromatic diamine having bonded thereto a biphenyl ring substituted by a trifluoromethyl group having a positive value as the σp value under Hammett's rule (σp=0.54). The reduced viscosity of the polyimide precursor solution was 0.48 dl/g (concentration: 0.5 g/dl, in NMP, 30° C.), and from the IR measurement of the polyimide coating film, it was found to be a polyimide containing a trifluoromethylbiphenyl group.

Using the obtained polyimide precursor solution, a liquid crystal cell was prepared, whereby flawless uniform alignment was obtained. Further, the water repellency and the tilt angle of the polyimide coating film were as shown in Table 3.

COMPARATIVE EXAMPLE 4

A polyimide precursor solution was prepared in the same manner as in Example 5 except that 459 mg (1.66 mmol) of 4-(biphenyl-4-oxy)-1,3-diaminobenzene was used as an aromatic diamine having bonded thereto a non-substituted biphenyl group having a 0 value as the σp value under Hammett's rule. The reduced viscosity of the polyimide precursor solution was 0.71 dl/g (concentration: 0.5 g/dl, in NMP, 30° C.), and the water repellency and the tilt angle of the polyimide coating film were as shown in Table 3.

COMPARATIVE EXAMPLE 5

A polyimide precursor solution was prepared in the same manner as in Example 5 except that 509 mg (1.66 mmol) of 4-(4-methoxybiphenyl-4'-oxy)-1,3-diaminobenzene was used as an aromatic diamine having bonded thereto a biphenyl ring substituted by a methoxy group having a negative value as the σp value under Hammett's rule (σp= −0.27). The reduced viscosity of the polyimide precursor solution was 0.56 dl/g (concentration: 0.5 g/dl, in NMP, 30° C.), and the water repellency and the tilt angle of the polyimide coating film were as shown in Table 3.

COMPARATIVE EXAMPLE 6

A polyimide precursor solution was prepared in the same manner as in Example 5 except that 485 mg (1.66 mmol) of 4-(4-hydroxybiphenyl-4'-oxy)-1,3-diaminobenzene was used as an aromatic diamine having bonded thereto a biphenyl ring substituted by a hydroxyl group having a negative value as the σp value under Hammett's rule (σp= −0.36). The reduced viscosity of the polyimide precursor solution was 0.97 dl/g (concentration: 0.5 g/dl, in NMP, 30° C.), and the water repellency and the tilt angle of the polyimide coating film were as shown in Table 3.

TABLE 3

| | Substituent | σp value | Surface energy | Tilt angle |
|---|---|---|---|---|
| Example 5 | CN | 0.66 | 56 dyn/cm | 55° |
| Example 6 | OCF$_3$ | 0.54 | 28 dyn/cm | 85° |
| Example 7 | F | 0.06 | 44 dyn/cm | 60° |
| Example 8 | CF$_3$ | 0.35 | 28 dyn/cm | 80° |
| Comparative Example 4 | H | 0 | 49 dyn/cm | 15° |
| Comparative Example 5 | OCH$_3$ | −0.27 | 50 dyn/cm | 9° |
| Comparative Example 6 | OH | −0.36 | 54 dyn/cm | 5° |

The liquid crystal alignment film of the present invention is capable of uniformly aligning liquid crystal and increasing the tilt angle, as it is made of a polyimide having, on its side chain, a benzene or biphenyl ring substituted by a monovalent substituent having a positive value as the σp value under Hammett's rule.

What is claimed is:

1. A liquid crystal alignment film made of a polyimide which has, on its side chain, a benzene or biphenyl ring substituted by a monovalent substituent having a positive value as the σp value under Hammett's rule.

2. The liquid crystal alignment film according to claim 1, wherein the polyimide is a polyimide obtained by reacting an aromatic diamine having bonded thereto a benzene or biphenyl ring substituted by a monovalent substituent having a positive value as the σp value under Hammett's rule, with a tetracarboxylic acid or its derivative to obtain a polyimide precursor having a reduced viscosity of from 0.05 to 5.0 dl/g (in N-methylpyrrolidone at 30° C., concentration: 0.5 g/dl) and subjecting the polyimide precursor to ring closure, wherein said derivative is a derivative of a tetracarboxylic acid capable of forming said polyimide precursor.

3. The liquid crystal alignment film according to claim 1, wherein the polyimide is a polyimide obtained by reacting a diamine component containing at least 5 mol % of an aromatic diamine having bonded thereto a benzene or biphenyl ring substituted by a monovalent substituent having a positive value as the σp value under Hammett's rule, with a tetracarboxylic acid or its derivative to obtain a polyimide precursor having a reduced viscosity of from 0.05 to 5.0 dl/g (in N-methylpyrrolidone at 30° C., concentration: 0.5 g/dl) and subjecting the polyimide precursor to ring closure, wherein said derivative is a derivative of a tetracarboxylic acid capable of forming said polyimide precursor.

4. The liquid crystal alignment film according to claim 2, wherein the aromatic diamine having bonded thereto a benzene or biphenyl ring substituted by a monovalent substituent having a positive value as the σp value under Hammett's rule, is a diamine of the formula (I):

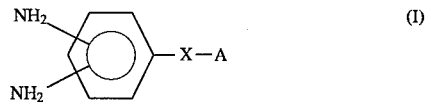

wherein A is

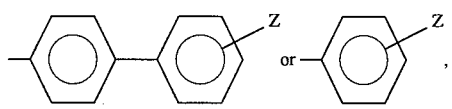

X is a bivalent connecting group selected from the group consisting of a single bond, —O—, —COO— and —CONH—, and Z is a monovalent substituent having a positive value as the σp value under Hammett's rule.

5. The liquid crystal alignment film according to claim 3, wherein the aromatic diamine having bonded thereto a benzene or biphenyl ring substituted by a monovalent substituent having a positive value as the σp value under Hammett's rule, is a diamine of the formula (I):

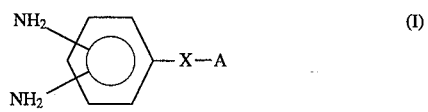

wherein A is

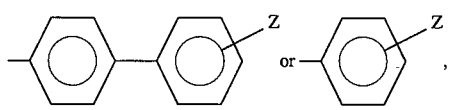

X is a bivalent connecting group selected from the group consisting of a single bond, —O—, —COO— and —CONH—, and Z is a monovalent substituent having a positive value as the σp value under Hammett's rule.

* * * * *